April 5, 1955 — L. O. MYERS — 2,705,651
FLANGED PIPE IN SOCKET SWIVEL
Filed Nov. 27, 1950

INVENTOR
LEON O. MYERS
BY
Joseph B. Gardner
ATTORNEY

United States Patent Office 2,705,651
Patented Apr. 5, 1955

2,705,651

FLANGED PIPE IN SOCKET SWIVEL

Leon O. Myers, Sacramento, Calif., assignor to L. O. Myers Corporation, Sacramento, Calif., a corporation of California Application November 27, 1950, Serial No. 197,791

2 Claims. (Cl. 285—97.8)

This invention relates to conduit fittings and is particularly directed to a swivel-type joint which permits one conduit to be rotated relative to another conduit while still maintaining leakproof flow communication therebetween.

Numerous devices of this general variety have been heretofore utilized by the trade, but in most instances these fittings possessed one or more undesirable characteristics rendering the same objectionable or impractical for their designed uses. One of the chief difficulties present in prior art devices was their inability to insure a fluidtight connection for both pressure and vacuum lines, and in many instances, after a relatively short period of use, the fittings would undesirably permit fluid or air leakage in either pressure or vacuum connections. Further objections of these older type fittings were due to their high cost of production, complicated forms of construction, and difficulty of ready rotation of one portion of the fitting while maintaining the seal.

It is therefore an object of the present invention to provide a swivel or swing type flexible fitting in which improved sealing means are provided, so that irrespective of the nature of the fluid being conveyed, the joint will be maintained in leakproof condition in all rotational positions thereof.

Another object of my invention is to provide a fitting of the character described in which a novel bearing surface is utilized permitting ease of rotation of the fitting parts.

A further object of this invention is to provide a fitting of the type above referred to which readily lends itself to mass production manufacturing methods so as to substantially reduce the ultimate cost to the user.

A still further object of the invention is to provide a fitting of the above character which is capable of maintaining its prescribed functions over long periods of time and in which the parts more susceptible to wear may be readily replaced.

Yet another object of this invention is to provide a device of the character described which is constructed in a way reducing the number of parts to a minimum and at the same time insuring the proper functioning of the device under all conditions of use.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figure 1:
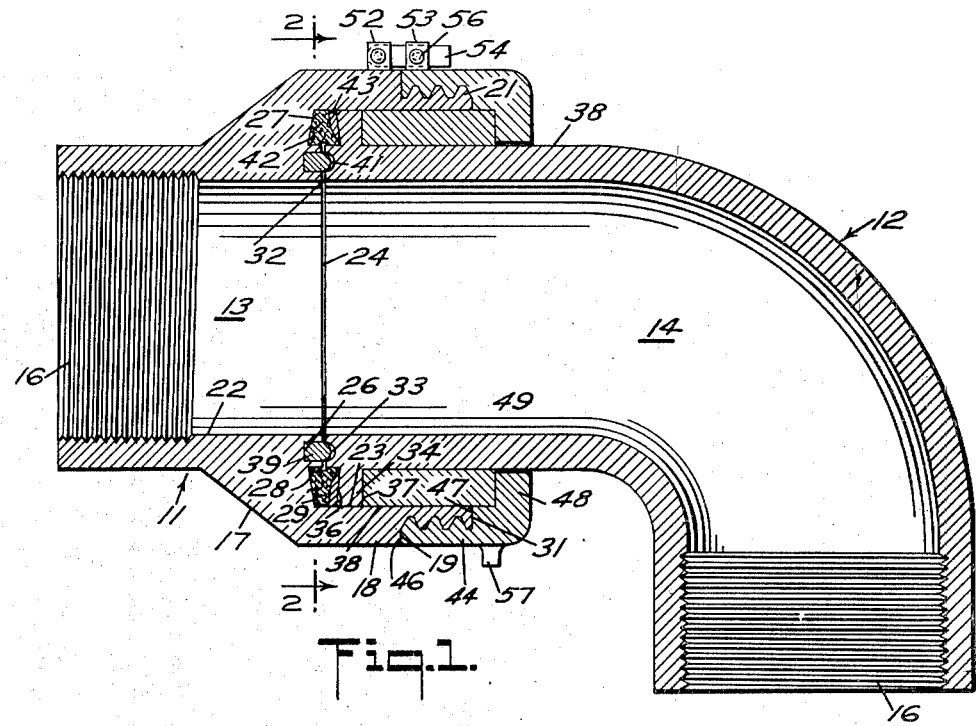
Figure 1 is a side cross-sectional view of the fitting of my invention.
Figure 2:
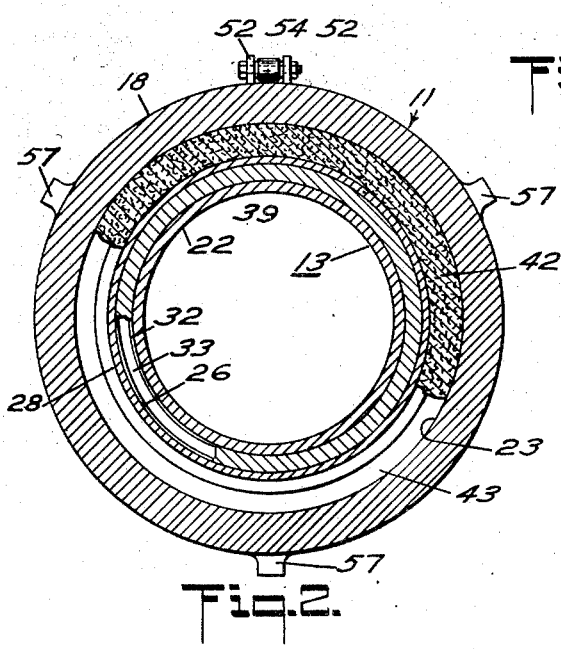
Figure 2 is a cross-sectional view taken along the plane indicated by the lines 2—2 of Figure 1.

In the drawing, I have disclosed the fitting of my invention in assembled position and arranged to receive the externally threaded ends of a pair of conduits to be disposed at right angles to each other. However, as the fitting will be hereafter described in detail, it will become clear that the fitting may be designed to receive internally threaded conduits and/or conduits disposed in other than right angularly related positions.

As here shown, the fitting comprises a body 11 and a coupling 12, each provided with an axial bore 13 and 14 respectively, and arranged to be disposed in generally abutting relation. The distal ends of the body and coupling are preferably provided with internal threads 16 so as to receive the externally threaded ends of a pair of conduits (not shown) and place the conduits in flow communication. As will be understood, because of the seal arrangement to be presently described, when the conduits are thus engaged with the fitting, each may be rotated with its respective portion of the fitting without danger of leakage.

The body 11 is provided with a radially outwardly inclined portion 17 formed integrally with a generally annular ring 18 formed with a radial shoulder 19 and peripherally extending threads 21. The threads are, for purpose of manufacturing economy, preferably acme threads so that they may be cast or otherwise formed with the body 11. It will be seen that the ring 18 defines a bore substantially larger than bores 13 and 14 and the respective walls 22 and 23 of bore 13 and the ring bore are joined by a radial wall member 24 which is provided with a generally rectangular annular groove 26 adjacent bore 13 and an annular notched portion 27 in abutting relation to wall 23. Notch 27 includes a transaxial shoulder 28 and a wall 29 angularly related to wall member 24, and the distal threaded end of ring 18 terminates in a flat shoulder 31.

With reference to the coupling 12, the end remote from threads 16 is provided with a shoulder 32 including an annular groove 33 of generally semi-circular cross-sectional form which is aligned with groove 26 when the body and coupling are in assembled relation. Adjacent the said remote end of the coupling is a peripherally extending lug 34 having a slight outwardly tapering side wall 36 adjacent notch 27 and a radial shoulder 37, the lug terminating at its peripheral surface 38.

Means are provided for effecting a seal between the abutting faces 24 and 32 of the body and coupling respectively, and as here shown, such means first include a bearing 39 of sinter bronze or like material which is arranged to fit snugly in groove 26 and provided with a generally arcuate end 41 extending from groove 26 and engageable by the groove 33 of the coupling member.

It is desirable that the radius of curve of groove 33 be slightly less than that of the bearing end 41 so that when the fitting members are brought together, only a double line contact will be effected between the bearing 39 and the coupling. The bronze bearing will thus not only permit free rotation of the coupling relative to the fitting body, but also provides a primary seal on the opposed ends of the members. However, as such a bearing will not absolutely prevent leakage, I also provide a packing 42 disposed in notch 27 and adjacent wall 36 of the coupling lug.

Another bearing 43 of sinter bronze or the like is preferably formed with or secured to the packing and provides a bearing surface for the lug wall 36. In this manner, it will be clear that when the body and coupling are maintained in adjacent relationship, an effective seal is provided, as well as efficient bearing surfaces permitting ready rotation of the coupling relative to the body.

Figure 3:
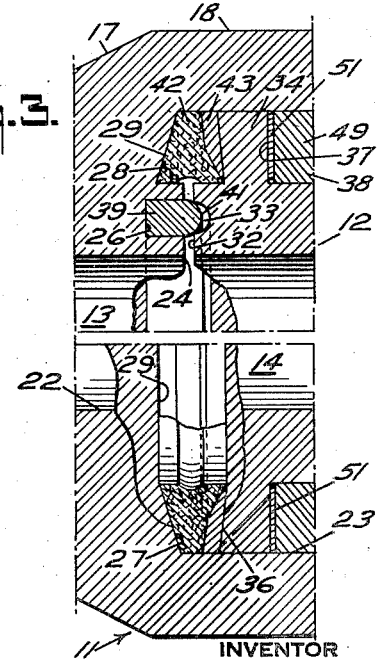
Figure 3 is an enlarged cross-sectional view of a portion of the fitting shown in Figure 1.

To rotatably clamp the body and coupling in their aforesaid relationship, I provide a lock nut 44 provided with threads engageable with the body threads 21 and with a pair of axially spaced and radially offset shoulders 46 and 47 respectively engageable with shoulders 19 and 31 of the body ring. The nut 44 is further provided with an inwardly extending peripheral lug 48 in general axial alignment with lug 34, and between the opposed surfaces of the lugs is disposed an annular master bearing ring 49 of sinter bronze or similar material. It will be seen that as the lock nut is tightened on the body threads 21, lug 48 will urge bearing 49 to the left (as viewed in Figure 1) against lug 34 and maintain the body and coupling members in intimate engagement. Due to the limited number of threads or possible variations in size of the bearing 49, it may be necessary to add shims 51 as seen in Figure 3 between one or both ends of bearing 49 and its associated lug to insure snug engagement of the parts. It will further be noted that bearing 49 provides an axial extended bearing surface between the inner periphery of ring 18 of the body and the outer periphery of the coupling member to facilitate rotation of the parts, yet due to the effective seal created by bearing 39 and packing 42, leakage of air or liquid from or into the fitting interior will be eliminated. Also, as the parts are rotated, the three bearings, namely 39, 43 and 49, which are preferably of a softer material than that of the coupling and body members, will provide adequate rotatable surfaces and prevent undue wear of the parts of the fitting while in no way interfering with the seal thereof.

If desired, means may be provided for preventing accidental displacement or removal of the lock nut, and may include axially aligned ears 52 and 53 on ring 18 and nut 44 respectively, an arm 54 pivoted to ears 52 and provided with an aperture through which a pin or bolt 56 may extend and enter corresponding apertures on ears 53. In this manner, rotation of the nut is prevented until the arm is released from its locking position. Also, if desired, the locking nut may be provided with one or more peripheral lugs 57 whereby the nut may be readily rotated by striking the lugs with a hammer or similar instrument.

From the foregoing, it will be seen that I have provided a swivel type or flexible joint in which a substantially uniform and unobstructed flow path is provided, which effectively seals the fitting against leakage, and which may be readily rotated when necessary to do so without affecting the seal characteristics.

I claim:

1. A flexible fitting, comprising a body member having an axial bore and provided with a radial shoulder extending outwardly from said bore and an annular ring extending axially from said shoulder, said shoulder being provided with a first annular groove adjacent said axial bore and a second annular groove adjacent said ring, a coupling member having an axial bore aligned with and of substantially the same diameter as said body bore and provided with a radial shoulder directly opposed to said body shoulder and a radially extending coupling lug axially spaced from said shoulder, a locking nut releasably engageable with said ring and having a lug axially aligned with and spaced from said coupling lug, an annular bearing disposed between the opposed faces of said coupling lug and said nut lug and providing bearing surfaces for the inner surface of said body member ring and the outer surface of said coupling, a second annular bearing insertible in said first annular groove of said body shoulder and having a curved distal end portion extending axially from said shoulder, said coupling shoulder having a groove therein axially aligned with said first annular body member groove and having portions thereof engageable with said second bearing, said coupling shoulder groove having a curvature less than that of said distal end portion of said latter bearing, and a packing seal ring disposed in said second annular groove of said body shoulder and extending axially from the shoulder.

2. A flexible fitting of the type described comprising, a body member having an axial bore terminating at a radial shoulder portion and provided with an integral annular member axially extending from said shoulder, said shoulder portion having a pair of concentric annular grooves therein, a coupling member having an axial bore aligned with and of substantially the same diameter as said body bore, said coupling member having a radial shoulder provided with an arcuate groove axially aligned with one of said body annular grooves and also having a radially extending coupling lug axially aligned with the other of said body annular grooves, said latter groove and said lug defining a recess of radial outward converging cross-sectional form, a lock nut threadedly engageable with said body annular member and having an inwardly extending radial lug axially aligned with said coupling lug, an annular bearing ring disposed between said lugs and adjacent said annular member and coupling, a bearing member disposed in one of said annular grooves and having an arcuate end portion engageable with said arcuate groove of said coupling, a packing ring disposed in said recess, and a bearing member disposed between said packing ring and said coupling lug.

References Cited in the file of this patent

UNITED STATES PATENTS

| | | |
|---|---|---|
| 676,846 | Moran | June 18, 1901 |
| 750,932 | Baird | Feb. 2, 1904 |
| 904,673 | Bideker | Nov. 24, 1908 |
| 1,715,854 | McKenzie-Martyn | June 4, 1929 |
| 1,985,012 | Boehm | Dec. 18, 1934 |
| 2,269,431 | Allen | Jan. 13, 1942 |
| 2,421,974 | Vandervoort | Jan. 10, 1947 |
| 2,525,652 | Cunningham | Oct. 10, 1950 |